United States Patent
Chen et al.

(10) Patent No.: US 12,156,259 B2
(45) Date of Patent: Nov. 26, 2024

(54) RESOURCE CONFIGURATION METHOD, RANDOM ACCESS METHOD, NETWORK SIDE DEVICE AND TERMINAL

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Ningyu Chen, Beijing (CN); Yang Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 401 days.

(21) Appl. No.: 17/432,180

(22) PCT Filed: Jan. 20, 2020

(86) PCT No.: PCT/CN2020/073146
§ 371 (c)(1),
(2) Date: Aug. 19, 2021

(87) PCT Pub. No.: WO2020/168889
PCT Pub. Date: Aug. 27, 2020

(65) Prior Publication Data
US 2022/0191943 A1    Jun. 16, 2022

(30) Foreign Application Priority Data
Feb. 21, 2019   (CN) .......................... 201910129895.1

(51) Int. Cl.
*H04W 74/0833*   (2024.01)
*H04W 72/02*      (2009.01)
(Continued)

(52) U.S. Cl.
CPC ....... *H04W 74/0841* (2013.01); *H04W 72/02* (2013.01); *H04W 72/0446* (2013.01); *H04W 72/0453* (2013.01); *H04W 74/0866* (2013.01)

(58) Field of Classification Search
CPC ............. H04W 74/0841; H04W 72/02; H04W 72/0446; H04W 72/0453; H04W 74/0866;
(Continued)

(56) References Cited

U.S. PATENT DOCUMENTS

2018/0124626 A1*  5/2018  Tsai ................... H04L 25/0202
2019/0075598 A1*  3/2019  Li ..................... H04W 74/0833
(Continued)

FOREIGN PATENT DOCUMENTS

CN    107360628 A    11/2017
CN    108282895 A    7/2018
(Continued)

OTHER PUBLICATIONS

International Search Report in the international application No. PCT/CN2020/073146, mailed on Apr. 22, 2020, 2 pgs.
(Continued)

*Primary Examiner* — Rina C Pancholi
(74) *Attorney, Agent, or Firm* — Cooper Legal Group, LLC (57) ABSTRACT

Provided are a resource configuration method, a random access method, a network side device and a terminal. The method comprises: sending first configuration information to a terminal, wherein the first configuration information is first configuration information of a first message that is randomly accessed, and the first message comprises: a
(Continued)

Send first configuration information to a terminal; the first configuration information is first configuration information of a first message for random access; the first message includes a preamble and a payload; the first configuration information is used to configure at least one first resource for sending the preamble, and at least one second resource corresponding to each of the at least one first resource and for sending the payload

11 preamble and a load; and the first configuration information is used for configuring at least one first resource for sending the preamble and at least one second resource that corresponds to each first resource respectively and is used for sending the load.

14 Claims, 6 Drawing Sheets

(51) Int. Cl.
*H04W 72/0446* (2023.01)
*H04W 72/0453* (2023.01)
*H04W 74/08* (2009.01)

(58) Field of Classification Search
CPC .......... H04W 74/006; H04W 74/0833; H04W 74/002; H04L 5/00; H04L 5/0048
See application file for complete search history.

(56) References Cited

U.S. PATENT DOCUMENTS

| | | | | |
|---|---|---|---|---|
| 2019/0342925 | A1* | 11/2019 | Zhang | H04W 52/36 |
| 2019/0357265 | A1* | 11/2019 | Ren | H04W 72/0446 |
| 2019/0387551 | A1* | 12/2019 | Liu | H04L 5/0053 |
| 2020/0214044 | A1* | 7/2020 | Qian | H04W 52/50 |
| 2021/0029746 | A1* | 1/2021 | Turtinen | H04W 72/23 |
| 2021/0219349 | A1* | 7/2021 | Huang | H04W 74/0833 |

FOREIGN PATENT DOCUMENTS

| | | |
|---|---|---|
| WO | 2018127042 A1 | 7/2018 |
| WO | 2018133437 A1 | 7/2018 |

OTHER PUBLICATIONS

English translation of the Written Opinion of the International Search Authority in the international application No. PCT/CN2020/073146, mailed on Apr. 22, 2020, 4 pgs.

"Considerations on the channel structure of msgA", Mar. 2019, Source: ZTE, Sanechips, 3GPP TSG RAN WG1 Meeting #96, R1-1901626, Athens, Greece, 5 pgs.

"Considerations on 2-Step RACH Procedures", Mar. 2019, Source: ZTE, Sanechips, 3GPP TSG RAN WG1 Meeting #96, R1-1901627, Athens, Greece, 11 pgs.

* cited by examiner

Send first configuration information to a terminal; the first configuration information is first configuration information of a first message for random access; the first message includes a preamble and a payload; the first configuration information is used to configure at least one first resource for sending the preamble, and at least one second resource corresponding to each of the at least one first resource and for sending the payload ⟋ 11

FIG. 1

Receive first configuration information sent by a network device; the first configuration information is first configuration information of a first message for random access; the first message includes a preamble and a payload; the first configuration information is used to configure at least one first resource for sending the preamble, and at least one second resource corresponding to each of the at least one first resource and for sending the payload ⟋ 21

RESOURCE CONFIGURATION METHOD, RANDOM ACCESS METHOD, NETWORK SIDE DEVICE AND TERMINAL

CROSS-REFERENCE TO RELATED APPLICATION

This application claims priority to Chinese patent application No. 201910129895.1 filed on Feb. 21, 2019, the disclosure of which is hereby incorporated by reference in its entirety.

TECHNICAL FIELD

The disclosure relates to the technical field of communications, and particularly to a method for resource configuration, a method for random access, a network device, and a terminal.

BACKGROUND

In the related art, a contention-based random access procedures include four-step random access and two-step random access. The four-step random access includes: Message 1 (MSG 1): random access preamble; MSG 2: random access response; MSG3: uplink transmission, and MSG 4: random access contention resolution. The two-step random access includes: MSG A and MSG B, MSG A may be MSG 1+MSG 3, and MSG B may be MSG 2+MSG 4.

Specifically, the two-step random access includes:

Message A (MSG A), sent from a terminal to a network device.

Message B (MSG B), sent from the network device to the terminal.

Specifically, the MSG 1 refers to Preamble; MSG 2 refers to Random Access Response (RAR); MSG 3 refers to uplink transmission, which may include at least one of a Radio Resource Control (RRC) establishment request, an RRC resume request, an RRC reestablishment request, or uplink data transmission. MSG 4 may include at least one of contention resolution, an RRC establishment message, an RRC resume message, or an RRC reestablishment message.

In the two-step random access, MSG A includes MSG 1 and MSG 3, and the network device configures a time-frequency resource for MSG 1 and MSG 3 for the terminal. Since MSG 1 is based on contention, MSG A is also based on contention, resulting in the problem that if MSG 1 causes a conflict, MSG 3 will also cause a conflict, and the terminal cannot demodulate MSG3. Therefore, how to improve demodulation probability of MSG 3 is a key issue urgent to be solved.

SUMMARY

An objective of embodiments of the disclosure is to provide a method for resource configuration, a method for random access, a network device, and a terminal, to solve the problem of high demodulation failure rate of Message (MSG) 3, or payload, or MSG A in two-step random access.

To solve the problem, the embodiments of the disclosure provide a random access method for resource configuration, which may be applied to a network device, and include the following operations.

First configuration information is sent to a terminal. The first configuration information is first configuration information of a first message for random access. The first message includes a preamble and a payload.

The first configuration information is used to configure at least one first resource for sending the preamble, and at least one second resource corresponding to each first resource and for sending the payload.

Each of the first resources includes at least one of:

at least one preamble;

a time-frequency resource for sending the preamble; or a Radio Network Temporary Identity (RA-RNTI) used for identifying the time-frequency resource for sending the preamble.

The payload refers to MSG 3 of random access, or the payload includes at least one of:

a terminal identity;

a connection establishment request;

a connection resume request;

a connection reestablishment request; or a data packet.

The method may further include the following operation.

Second configuration information is sent to the terminal, the second configuration information is second configuration information of a second message for random access. The second message includes: MSG B for random access, or MSG 2 for random access, or MSG 4 for random access, or random access response.

The second configuration information is used to configure a response window and/or a third resource for receiving the second message.

The response window and/or the third resource for receiving the second message corresponds to the second resource for sending the payload.

The embodiments of the disclosure also provide a method for random access, which may be applied to a terminal and include the following operation.

First configuration information sent by a network device is received. The first configuration information is first configuration information of a first message for random access. The first message includes a preamble and a payload.

The first configuration information is used to configure at least one first resource for sending the preamble, and at least one second resource corresponding to each first resource and for sending the payload.

The method may further include the following operation.

The terminal selects one first resource from the at least one first resource to send the preamble and select one second resource from the at least one second resource corresponding to the selected first resource to send the payload.

Each of the first resources includes at least one of:

at least one preamble;

a time-frequency resource for sending the preamble; or a RA-RNTI for identifying the time-frequency resource for sending the preamble.

The payload refers to MSG 3 of random access, or the payload includes at least one of:

a terminal identity;

a connection establishment request;

a connection resume request;

a connection reestablishment request; or a data packet.

The method may further include the following operation.

Second configuration information configured by the network device is received. The second configuration information is second configuration information of a second message for random access. The second message includes: MSG B for random access, or MSG 2 for random access, or MSG 4 for random access, or random access response.

The second configuration information is used to configure a response window and/or a third resource for receiving the second message.

The response window and/or the third resource for receiving the second message corresponds to the second resource for sending the payload.

The method may further include the following operation.

The terminal receives the second message in the response window and/or the third resource for sending the payload.

The embodiments of the disclosure also provide a network device, including a memory, a processor, and a computer program that is stored on the memory and runnable on the processor, and the processor is configured to, when executing the computer program, implement the random access method for resource configuration as described above.

The embodiments of the disclosure also provide a resource configuration apparatus for random access, which is applied to a network device, and include a first configuration module.

The first configuration module is configured to send first configuration information to a terminal. The first configuration information is first configuration information of a first message for random access. The first message includes a preamble and a payload.

The first configuration information is configured to configure at least one first resource for sending the preamble, and at least one second resource corresponding to each first resource and for sending the payload.

The embodiments of the disclosure also provide a terminal, including a memory, a processor, and a computer program that is stored on the memory and runnable on the processor, and being characterized in that when executing the computer program, the processor implements the method for random access as described above.

The embodiments of the disclosure also provide a device for random access, which may be applied to a terminal and include a first receiving module.

The first receiving module is configured to receive first configuration information sent by a network device, the first configuration information being first configuration information of a first message of random access. The first message includes a preamble and payload.

The first configuration information is configured to configure at least one first resource for sending the preamble, and at least one second resource corresponding to each first resource and for sending the payload.

The embodiments of the disclosure also provide a computer-readable storage medium, in which a computer program may be stored and which is characterized in that the program is executed by a processor to implement the steps in the random access method for resource configuration as described above or the program is executed by the processor to implement the steps in the method for random access as described above.

The technical solutions of the disclosure at least have the following beneficial effects.

According to the disclosure, each group of resources of MSG 1 is configured with multiple resources for MSG 3 corresponding thereto, so that even if MSG 1 has a conflict, the network device may also distinguish MSG A from different terminals through the multiple resources for MSG 3, thereby increasing demodulation probability of MSG 3 and access probability of the terminals.

DETAILED DESCRIPTION

To make the technical problem to be solved, technical solutions, and advantages of the disclosure clearer, detailed descriptions will be made below in combination with the drawings and specific embodiments.

Figure 1:
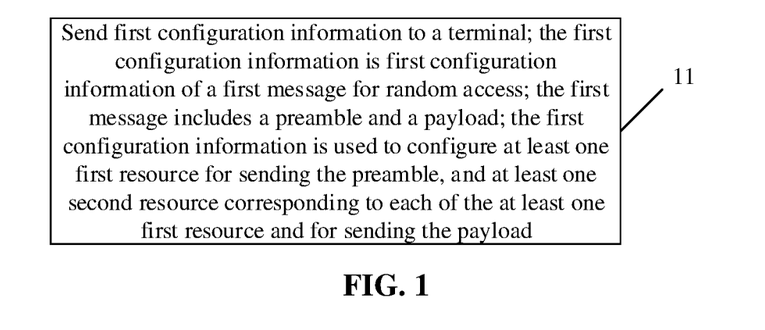
FIG. 1 is a diagram of steps of a resource configuration method for random access according to an embodiment of the disclosure.

As shown in FIG. 1, an embodiment of the disclosure provides a resource configuration method for random access, which is applied to a network device, and include the following operations.

In step 11, first configuration information is sent to a terminal. The first configuration information is first configuration information of a first message for random access. The first message includes a preamble and a payload.

The first configuration information is used to configure at least one first resource for sending the preamble, and at least one second resource corresponding to each first resource and for sending the payload.

The first message may also be Message A (MSG A).

The preamble in the first message may also be Preamble, or Message 1 (MSG 1); the payload in the first message may also be Message 3 (MSG 3), and the payload may include at least one of User Equipment Identity (UE ID), a connection establishment request, a connection resume request, a connection reestablishment request, or a data packet. The UE ID may be Resume ID, or may be a generated random number, or may be terminal identity such as Temporary mobile subscriber identity (TMSI), or Serving Temporary Mobile Subscriber Identity (S-TMSI), or a part of ng-5G-S-TMSI, or Globally Unique Temporary Identity (GUTI), or Cell Radio Network Temporary Identity (C-RNTI).

Specifically, regarding the at least one first resource, the preambles may be divided into multiple groups, and each group serves as a first resource, for example, 60 preambles are divided into 60 groups, and each group includes 1 preamble. Regarding the at least one second resource, each preamble group corresponds to multiple second resources for sending payload, for example, one preamble corresponds to five second resources. For another example, in the first configuration information, the terminal is configured with N groups of preamble resources for sending preambles, and each group of preamble resources is configured with a plurality of second resources for sending payload.

The network device may send the above first configuration information by means of a broadcast message, or may send the first configuration information to the terminal through a dedicated message (e.g., a RRC reconfiguration message).

Optionally, each first resource includes at least one of:
at least one preamble;
a time-frequency resource for sending the preamble; and
a Random Access-Radio Network Temporary Identity (RA-RNTI) for identifying the time-frequency resource for sending the preamble.

For example, the network device sends first configuration information to the terminal, the first configuration information include a plurality of preambles and a plurality of time-frequency resources, and any one of the preambles and any one of the time-frequency resources constitutes a first resource; and the first configuration information also include at least one second resource corresponding to each first resource.

It is to be noted that, when the first configuration information is for non-contention-based random access, the number of the second resources corresponding to each first resource is greater than or equal to 1; when the first configuration information is for contention-based random access, the number of the second resources corresponding to each first resource needs to be greater than or equal to 2.

The non-contention-based random access uses reserved resources, which may not cause a conflict. For the contention-based random access, the network device may configure at least two second resources for each group of first resources, thereby reducing contention probability of uplink resource transmission.

As an alternative embodiment, the method further includes the following operations.

Second configuration information is sent to the terminal. The second configuration information is second configuration information of a second message for random access. The second message includes: Message B, (i.e., MSG B) for random access, or Message 2 (i.e., MSG 2) for random access, or Message 4 (MSG 4) for random access, or random access response.

The second configuration information is used to configure a response window and/or a third resource for receiving the second message.

The message B (i.e., MSG B) is a second message of two-step random access.

The message 2 (i.e., MSG 2) is a second message of four-step random access, or a part of a second message of the two-step random access, or a second message of the two-step random access falling back to the four-step random access.

The random access response is also referred to as RAR.

It is to be noted that the MSG 2 and/or the MSG 4 constitutes MSG B of the two-step random access. The MSG 2 refers to RAR; the MSG 4 refers to a contention resolution message or a connection establishment complete message (e.g., a RRC establishment message, or a RRC resume message, or a RRC reestablishment message).

For example, the network device sends second configuration information to the terminal, and configures a response window and/or a third resource that corresponds to each second resource.

Further, it is to be noted that, the response window and/or the third resource for receiving the second message corresponds to the second resource for sending the payload. For example, the terminal sends the payload on a first one of the second resources, and receives a second message (MSG B or MSG 2) on a first response window and/or a third resource that corresponds to the first one of the second resources; for another example, the terminal sends the payload on a second one of the second resources, and then receives a second message (MSG B or MSG 2) on a second response window and/or a third resource that corresponds to the second one of the second resources.

In summary, according to the above embodiments of the disclosure, each group of resources of preambles is configured with multiple resources for payload corresponding thereto, so that even when the preambles have a conflict, the network device may distinguish MSG A from different terminals through the plurality of resources for the payload, thereby increasing demodulation probability of the payload and access probability of the terminal; moreover, a receiving window for MSG B corresponds to that for MSG 3, so that conflict of MSG B may be minimized.

Figure 2:
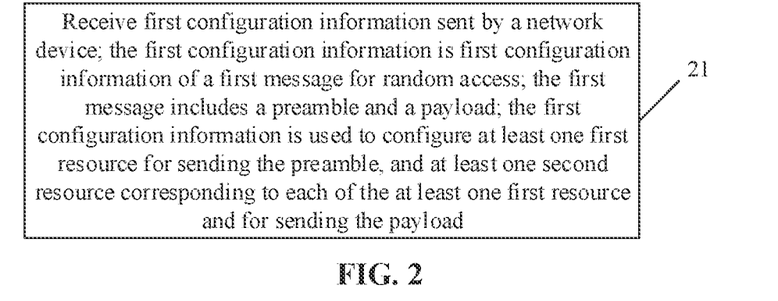
FIG. 2 is a diagram of steps of a method for random access according to an embodiment of the disclosure.

As shown in FIG. 2, an embodiment of the disclosure also provides a method for random access, which may be applied to a terminal and include the following operation.

In step 21, first configuration information sent by a network device is received. The first configuration information is first configuration information of a first message for random access. The first message includes a preamble and a payload.

The first configuration information is used to configure at least one first resource for sending the preamble, and at least one second resource corresponding to each first resource and for sending the payload.

The first message may also be Message A (MSG A).

The preamble in the first message may also be Preamble, or Message 1 (MSG 1); the payload in the first message may also be Message 2 (MSG 3), and the payload may include at least one of terminal identity (UE ID), a connection establishment request, a connection resume request, a connection reestablishment request, or a data packet. The UE ID may be Resume ID, or may be a generated random number, or may be terminal identity such as Temporary mobile subscriber identity (TMSI), or Serving Temporary Mobile Subscriber Identity (S-TMSI), or a part of ng-5G-S-TMSI, or Globally Unique Temporary Identity (GUTI), or Cell Radio Network Temporary Identity (C-RNTI).

Specifically, regarding the at least one first resource, the preambles may be divided into multiple groups, and each group serves as a first resource, for example, 60 preambles are divided into 60 groups, and each group includes 1 preamble. Regarding the at least one second resource, each preamble group corresponds to multiple second resources for sending payload, for example, one preamble corresponds to five second resources. For another example, in the first configuration information, the terminal is configured with N groups of preamble resources for sending preambles, and each group of preamble resources is configured with a plurality of second resources for sending payload.

Further, in the embodiment of the disclosure, the method may further include the following operation.

The terminal selects one first resource from the at least one first resource to send the preamble and select one second resource from the at least one second resource corresponding to the selected first resource to send the payload.

In short, a method for the terminal to send MSG A is to select one resource from the at least one first resource to send the preamble, and then select one second resource from the M second resources corresponding to the selected group of first resources to send the payload. A method of selecting the second resource may include randomly selecting, or selecting according to a certain default rule, which is not specifically limited here.

Optionally, each first resource includes at least one of:
at least one preamble;
a time-frequency resource for sending the preamble; or
a RA-RNTI for identifying the time-frequency resource for sending the preamble.

For example, the network device sends first configuration information to the terminal, the first configuration information includes a plurality of preambles and a plurality of time-frequency resources, and any one of the preambles and any one of the time-frequency resources constitutes a first resource; and the first configuration information also includes at least one second resource corresponding to each first resource.

It is to be noted that, when the first configuration information is for non-contention-based random access, the number of the second resources corresponding to each first resource is greater than or equal to 1; when the first configuration information is for contention-based random access, the number of the second resources corresponding to each first resource needs to be greater than or equal to 2.

The non-contention-based random access involves reserved resources, which may not conflict. For the contention-based random access, the network side will configure at least two corresponding second resources for each group of first resources, thereby reducing contention probability of uplink resource transmission.

As an alternative embodiment, the method further includes the following operations.

Second configuration information configured by the network device is received. The second configuration information is second configuration information of a second message for random access. The second message includes: MSG B for random access, or MSG 2 for random access, or MSG 4 for random access, or random access response.

The second configuration information is used to configure a response window and/or a third resource for receiving the second message.

The message B (i.e., MSG B) is a second message of the two-step random access.

The message 2 (i.e., MSG 2) is a second message of the four-step random access, or a part of a second message of the two-step random access, or a second message of the two-step random access falling back to the four-step random access.

The random access response is also referred to as RAR.

It is to be noted that MSG 2 and/or MSG 4 constitutes MSG B of the two-step random access. The MSG 2 refers to RAR; the MSG 4 refers to a contention resolution message or a connection establishment complete message (e.g., a RRC establishment message, or a RRC resume message, or a RRC reestablishment message).

For example, the network device sends the second configuration information to the terminal, and configures a response window and/or a third resource that corresponds to each second resource.

Furthermore, the method may further includes the following operation.

The terminal receives the second message in the response window and/or the third resource for sending the payload.

Further, it is to be noted that, the response window and/or the third resource for receiving the second message corresponds to the second resource for sending the payload. For example, the terminal sends the payload on a first one of the second resources, and receives a second message (MSG B or MSG 2) on a first response window and/or a third resource that corresponds to the first one of the second resources; for another example, the terminal sends the payload on a second one of the second resources, and then receives a second message (MSG B or MSG 2) on a second response window and/or a third resource that corresponds to the second one of the second resources.

Briefly, a method for UE to receive MSG B or MSG 2 is to receive MSG 2 or MSG B in the response window or the third resource that corresponds to the second resource.

In summary, according to the above embodiments of the disclosure, each group of resources of preambles is configured with multiple resources of payload corresponding thereto, so that even when the preambles have a conflict, the network device may distinguish MSG A from different terminals through the plurality of resources for the payload, thereby increasing demodulation probability of the payload and access probability of the terminal; moreover, a receiving window for MSG B corresponds to that for MSG 3, so that conflict of MSG B may be minimized.

Figure 3:
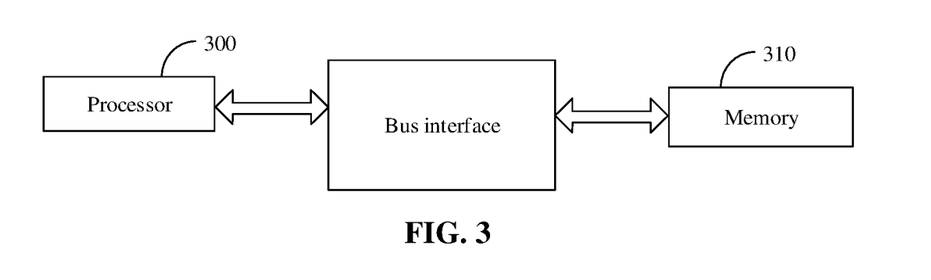
FIG. 3 is a diagram of a structure of a network device according to an embodiment of the disclosure.

As shown in FIG. 3, an embodiment of the disclosure also provides a network device, including a memory 310, a processor 300, and a computer program that is stored on the memory 310 and can run on the processor 300, and when executing the computer program, the processor 300 implements the resource configuration method for random access as described above.

In summary, according to the above embodiment of the disclosure, each group of resources of MSG 1 is configured with multiple resources for MSG 3 corresponding thereto, so that even when MSG 1 has a conflict, the network device may also distinguish MSG A from different terminals through the plurality of resources for MSG 3, thereby increasing demodulation probability of MSG 3 and access probability of the terminal; moreover, a receiving window for MSG B corresponds to that for MSG 3, so that conflict of MSG B may be minimized.

It is to be noted that the network device provided in the embodiment of the disclosure is a network device capable of executing the above resource configuration method for random access, all embodiments of the above resource configuration method for random access are applicable to the network device, and the same or similar beneficial effects may be achieved.

Figure 4:
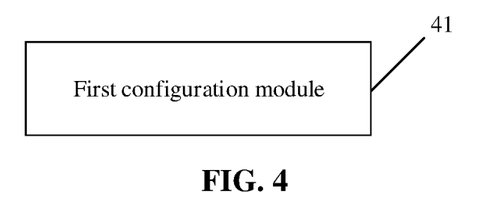
FIG. 4 is a diagram of a structure of a resource configuration apparatus for random access according to an embodiment of the disclosure.

As shown in FIG. 4, an embodiment of the disclosure also provides a resource configuration device for random access, which is applied to a network device, and includes a first configuration module 41.

The first configuration module 41 is configured to send first configuration information to a terminal. The first configuration information is first configuration information of a first message for random access. The first message includes a preamble and a payload.

The first configuration information is used to configure at least one first resource for sending the preamble, and at least one second resource corresponding to each first resource and for sending the payload.

Optionally, in the above embodiment of the disclosure, each first resource includes at least one of:
at least one preamble;
a time-frequency resource for sending the preamble; and
a RA-RNTI for identifying the time-frequency resource for sending the preamble.

Optionally, in the embodiment of the disclosure, the payload refers to MSG 3 of random access, or the payload includes at least one of:
a terminal identity;
a connection establishment request;
a connection resume request;
a connection reestablishment request; or
a data packet.

Optionally, in the embodiment of the disclosure, the device further includes a second configuration module.

The second configuration module is configured to send second configuration information to the terminal. The second configuration information is second configuration information of a second message for random access, and the second message includes: MSG B for random access, or MSG 2 for random access, or MSG 4 for random access, or random access response.

The second configuration information is used to configure a response window and/or a third resource for receiving the second message.

Optionally, in the above embodiment of the disclosure, the response window and/or the third resource for receiving the second message corresponds to the second resource for sending the payload.

In summary, according to the above embodiment of the disclosure, each group of resources of preambles is configured with multiple resources for the payload corresponding thereto, so that even when the preambles have a conflict, the network device may also distinguish MSG A from different terminals through the multiple resources for the payload, thereby increasing demodulation probability of the payload and access probability of the terminal; moreover, a receiving window for MSG B corresponds to the payload, so that conflict of MSG B may be minimized.

It is to be noted that the resource configuration device for random access provided in the embodiment of the disclosure is a device capable of executing the above resource configuration method for random access, all embodiments of the resource configuration method for random access are applicable to the device, and the same or similar beneficial effects may be achieved.

An embodiment of the disclosure also provides a computer-readable storage medium, in which a computer program is stored. The program is executed by a processor to implement each process in the embodiment of the resource configuration method for random access. The same technical effects may be achieved. To avoid repetitions, elaborations are omitted herein. The computer-readable storage medium is, for example, a Read-Only Memory (ROM), a Random Access Memory (RAM), a magnetic disk, or an optical disk.

Figure 5:
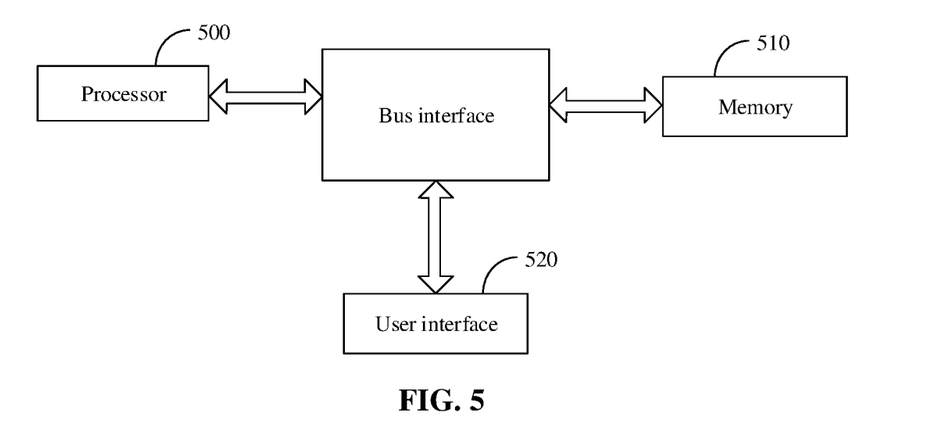
FIG. 5 is a diagram of a structure of a terminal according to an embodiment of the disclosure.

As shown in FIG. 5, an embodiment of the disclosure also provides a terminal, including a memory 510, a processor 500, a user interface 520, and a computer program that is stored on the memory 510 and can run on the processor 500, and when executing the computer program, the processor 500 implements the method for random access as described above.

In summary, according to the above embodiment of the disclosure, each group of resources of preambles is configured with multiple resources for payload corresponding thereto, so that even when the preambles have a conflict, the network device may also distinguish MSG A from different terminals through the plurality of resources for payload, thereby increasing demodulation probability of the payload and access probability of the terminal; moreover, a receiving window for MSG B corresponds to the payload, so that conflict of MSG B may be minimized.

It is to be noted that the terminal provided in the embodiment of the disclosure is a terminal capable of executing the above method for random access, all embodiments of the method for random access are applicable to the terminal, and the same or similar beneficial effects may be achieved.

Figure 6:
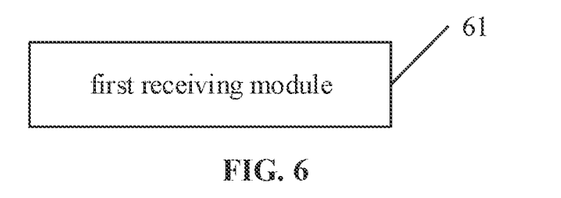
FIG. 6 is a diagram of a structure of a device for random access according to an embodiment of the disclosure.

As shown in FIG. 6, an embodiment of the disclosure also provides a device for random access, which may be applied to a terminal and include a first receiving module 61.

The first receiving module 61 is configured to receive first configuration information sent by a network device. The first configuration information is first configuration information of a first message for random access. The first message includes a preamble and a payload.

The first configuration information is used to configure at least one first resource for sending the preamble, and at least one second resource corresponding to each first resource and for sending the payload.

Optionally, in the embodiment of the disclosure, the device may further include a first sending module.

The first sending module is configured to select one first resource from the at least one first resource to send the preamble and select one second resource from the at least one second resource corresponding to the selected first resource to send the payload.

Optionally, in the embodiment of the disclosure, each first resource includes at least one of:
at least one preamble;
a time-frequency resource for sending the preamble; and
a RA-RNTI for identifying the time-frequency resource for sending the preamble.

Optionally, in the embodiment of the disclosure, the payload refers to MSG 3 for random access, or the payload includes at least one of:
a terminal identity;
a connection establishment request;
a connection resume request;
a connection reestablishment request; or
a data packet.

Optionally, in the embodiment of the disclosure, the device further includes a second receiving module.

The second receiving module is configured to receive second configuration information configured by the network device, the second configuration information is second configuration information of a second message for random access. The second message includes: MSG B for random access, or MSG 2 for random access, or MSG 4 for random access, or random access response.

The second configuration information is used to configure a response window and/or a third resource for receiving the second message.

Optionally, in the above embodiment of the disclosure, the response window and/or the third resource for receiving the second message corresponds to the second resource for sending the payload.

Optionally, in the embodiment of the disclosure, the device further includes a second receiving module.

The second receiving module is configured to receive the second message in the response window and/or the third resource for sending the payload.

In summary, according to the above embodiment of the disclosure, each group of resources of preambles is configured with multiple resources for the payload corresponding thereto, so that even when the preambles have a conflict, the network device may also distinguish MSG A from different terminals through the multiple resources for payload, thereby increasing demodulation probability of the payload and access probability of the terminal; moreover, a receiving window for MSG B corresponds to that for the payload, so that conflict of MSG B may be minimized.

It is to be noted that the device for random access provided in the embodiment of the disclosure is a device capable of executing the above method for random access, all embodiments of the method for random access are applicable to the device, and the same or similar beneficial effects may be achieved.

An embodiment of the disclosure also provides a computer-readable storage medium, in which a computer program is stored. The program is executed by a processor to implement each process in the embodiment of the method for random access. The same technical effects may be achieved. To avoid repetitions, elaborations are omitted herein. The computer-readable storage medium is, for example, a ROM, a RAM, a magnetic disk, or an optical disk.

Those skilled in the art should know that the embodiment of the disclosure may be provided as a method, a system, or a computer program product. Therefore, the disclosure may adopt a form of pure hardware embodiment, pure software embodiment, or combined software and hardware embodiment. Moreover, the disclosure may adopt a form of computer program product implemented in one or more computer-readable storage media (including, but not limited to, a disk memory, an optical memory, etc.) including computer-available program codes.

The disclosure is described with reference to flowcharts and/or block diagrams of the method, device (system), and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of another programmable data processing device to generate a machine, so that a device for realizing a function specified in one flow or multiple flows in the flowcharts and/or one block or multiple blocks is generated by the instructions executed through the computer or the processor of the other programmable data processing device.

These computer program instructions may also be stored in a computer-readable storage medium capable of guiding the computer or the other programmable data processing device to work in a specific manner, so that a product including an instruction apparatus may be generated by the instructions stored in the computer-readable storage medium, the instruction apparatus realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is the optional implementation mode of the disclosure. It is to be pointed out that those of ordinary skill in the art may further make a plurality of improvements and embellishments without departing from the principle of the disclosure, and these improvements and embellishments shall also fall within the scope of protection of the disclosure.

The invention claimed is:

1. A resource configuration method for random access, applied to a network device and the method comprising:
    sending first configuration information and second configuration information to a terminal, wherein the first configuration information is first configuration information of a first message for random access, wherein the first message comprises a preamble and a payload; and
    wherein the first configuration information is used to configure at least one first resource for sending the preamble, and a plurality of second resources corresponding to each first resource of the at least one first resource and for sending the payload,
    wherein the second configuration information is second configuration information of a second message for random access, wherein the second message comprises: Message B (MSG B) for random access, or Message 2 (MSG 2) for random access, or Message 4 (MSG 4) for random access, or random access response,
    wherein the second configuration information is used to configure a plurality of response windows or a plurality of third resources for receiving the second message,
    wherein each of the plurality of second resources for sending the payload corresponds to a respective one of the plurality of response windows or the plurality of third resources for receiving the second message.

2. The method of claim 1, wherein each of the at least one first resource comprises at least one of:
    at least one preamble;
    a time-frequency resource for sending the preamble; or
    a Radio Network Temporary Identity (RA-RNTI) for identifying the time-frequency resource for sending the preamble.

3. The method of claim 1, wherein the payload refers to Message 3 (MSG 3) for random access, or the payload comprises at least one of:
    a terminal identity;
    a connection establishment request;
    a connection resume request;
    a connection reestablishment request; or
    a data packet.

4. A method for random access, applied to a terminal, and the method comprising:
    receiving first configuration information and second configuration information sent by a network device, wherein the first configuration information is first configuration information of a first message for random access, and the first message comprises a preamble and a payload; and
    wherein the first configuration information is used to configure at least one first resource for sending the preamble, and a plurality of second resources corresponding to each first resource of the at least one first resource and for sending the payload,
    wherein the second configuration information is second configuration information of a second message for random access, and the second message comprises: Message B (MSG B) for random access, or Message 2 (MSG 2) for random access, or Message 4 (MSG 4) for random access, or random access response,
    wherein the second configuration information is used to configure a plurality of response windows or a plurality of third resources for receiving the second message,
    wherein each of the plurality of second resources for sending the payload corresponds to a respective one of the plurality of response windows or the plurality of third resources for receiving the second message.

5. The method of claim 4, further comprising:
    selecting, by the terminal, one first resource from the at least one first resource to send the preamble and select one second resource from the plurality of second resources corresponding to the selected first resource to send the payload.

6. The method of claim 4, wherein each of the at least one first resource comprises at least one of:
    at least one preamble;
    a time-frequency resource for sending the preamble; or
    a Radio Network Temporary Identity (RA-RNTI) used for identifying the time-frequency resource for sending the preamble.

7. The method of claim 4, wherein the payload refers to Message 3 (MSG 3) for random access, or the payload comprises at least one of:
- a terminal identity;
- a connection establishment request;
- a connection resume request;
- a connection reestablishment request; or
- a data packet.

8. The method of claim 4, further comprising:
receiving, by the terminal, the second message in the plurality of response windows or the plurality of third resources for receiving the second message.

9. A terminal, comprising a memory, a processor, and a computer program that is stored on the memory and runnable on the processor, wherein the processor is configured to, when executing the computer program, implement the method for random access of claim 4.

10. The terminal of claim 9, wherein the method further comprises:
selecting one first resource from the at least one first resource to send the preamble and select one second resource from the plurality of second resources corresponding to the selected first resource to send the payload.

11. The terminal of claim 9, wherein each of the at least one first resource comprises at least one of:
- at least one preamble;
- a time-frequency resource for sending the preamble; or
- a Radio Network Temporary Identity (RA-RNTI) used for identifying the time-frequency resource for sending the preamble.

12. A network device, comprising a memory, a processor, and a computer program that is stored on the memory and runnable on the processor, wherein the processor is configured to, when executing the computer program, implement a resource configuration method for random access, the method comprising:
sending first configuration information and second configuration information to a terminal, wherein the first configuration information is first configuration information of a first message for random access, wherein the first message comprises a preamble and a payload; and wherein the first configuration information is used to configure at least one first resource for sending the preamble, and a plurality of second resources corresponding to each first resource of the at least one first resource and for sending the payload, wherein the second configuration information is second configuration information of a second message for random access, wherein the second message comprises: Message B (MSG B) for random access, or Message 2 (MSG 2) for random access, or Message 4 (MSG 4) for random access, or random access response, wherein the second configuration information is used to configure a plurality of response windows or a plurality of third resources for receiving the second message, wherein each of the plurality of second resources for sending the payload corresponds to a respective one of the plurality of response windows or the plurality of third resources for receiving the second message.

13. The network device of claim 12, wherein each of the at least one first resource comprises at least one of:
- at least one preamble;
- a time-frequency resource for sending the preamble; or
- a Radio Network Temporary Identity (RA-RNTI) for identifying the time-frequency resource for sending the preamble.

14. The network device of claim 12, wherein the payload refers to Message 3 (MSG 3) for random access, or the payload comprises at least one of:
- a terminal identity;
- a connection establishment request;
- a connection resume request;
- a connection reestablishment request; or
- a data packet.

* * * * *